United States Patent
Dalmatov et al.

(10) Patent No.: US 11,163,451 B1
(45) Date of Patent: *Nov. 2, 2021

(54) TOP-DOWN IO LOAD BALANCING STORAGE SYSTEM AND METHOD

(71) Applicant: EMC IP Holding Company, LLC, Hopkinton, MA (US)

(72) Inventors: Nickolay Dalmatov, St. Petersburg (RU); Michael P. Wahl, Bulverde, TX (US); Jian Gao, Beijing (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,186

(22) Filed: Oct. 31, 2017

(51) Int. Cl.
*G06F 3/06* (2006.01)
*G06F 12/10* (2016.01)

(52) U.S. Cl.
CPC .......... *G06F 3/0611* (2013.01); *G06F 3/0644* (2013.01); *G06F 3/0647* (2013.01); *G06F 3/0689* (2013.01); *G06F 12/10* (2013.01); *G06F 2212/1024* (2013.01); *G06F 2212/262* (2013.01)

(58) Field of Classification Search
None
See application file for complete search history.

(56) References Cited

U.S. PATENT DOCUMENTS

| | | | |
|---|---|---|---|
| 6,687,805 B1 | 2/2004 | Cochran | |
| 6,711,649 B1 | 3/2004 | Bachmat et al. | |
| 6,834,326 B1 | 12/2004 | Wang et al. | |
| 7,984,259 B1 | 7/2011 | English | |
| 8,010,738 B1 | 8/2011 | Chilton et al. | |
| 8,443,163 B1 | 5/2013 | Bailey et al. | |
| 8,566,483 B1 | 10/2013 | Chen et al. | |
| 9,183,205 B1 | 11/2015 | Kurne et al. | |
| 9,213,721 B1 | 12/2015 | Faibish et al. | |
| 9,395,937 B1* | 7/2016 | Si | G06F 3/0689 |
| 9,513,814 B1* | 12/2016 | Can | G06F 3/061 |
| 2002/0120744 A1* | 8/2002 | Chellis | G06F 9/50 709/226 |
| 2002/0166079 A1* | 11/2002 | Ulrich | G06F 9/5083 714/6.12 |

(Continued)

OTHER PUBLICATIONS

"RAID types/levels and benefits explained", by Erin Sullivan and CHristoperh Poelker. Available online and attached to this OA. https://searchstorage.techtarget.com/answer/RAID-types-and-benefits-explained (Year: 2016).*

(Continued)

*Primary Examiner* — William E. Baughman
*Assistant Examiner* — Janice M. Girouard
(74) *Attorney, Agent, or Firm* — Brian J. Colandreo; Mark H. Whittenberger; Holland & Knight LLP

(57) ABSTRACT

A method, computer program product, and computing system for compartmentalizing a plurality of RAID extents, within a RAID system, into a plurality of rotation subgroups. An IO load imbalance condition is sensed in a first rotation subgroup, chosen from the plurality of rotation subgroups, that is associated with a plurality of logical data portions. At least one of the plurality of logical data portions is moved from the first rotation subgroup to a second rotation subgroup, chosen from the plurality of rotation subgroups.

23 Claims, 9 Drawing Sheets

(56) References Cited

U.S. PATENT DOCUMENTS

| | | | |
|---|---|---|---|
| 2007/0156957 A1* | 7/2007 | MacHardy | G06F 3/0607 |
| | | | 711/114 |
| 2009/0198940 A1 | 8/2009 | Ash et al. | |
| 2012/0317345 A1 | 12/2012 | Pan et al. | |
| 2013/0132696 A1 | 5/2013 | Tomida et al. | |
| 2014/0032839 A1 | 1/2014 | Konishi | |
| 2015/0142869 A1 | 5/2015 | Ulrich et al. | |
| 2016/0350021 A1 | 12/2016 | Matsushita et al. | |
| 2017/0220481 A1* | 8/2017 | McKean | G06F 12/1009 |
| 2017/0262223 A1* | 9/2017 | Dalmatov | G06F 3/0605 |

OTHER PUBLICATIONS

"DELL EMC Unity: Dynamic Pools" a white paper published Mar. 2018, that provides an introduction to Dynamic Pools. It provides an overview of Dynamic Pool technology, including information of the underlying structures, benefits for (Year: 2018).*

Non-Final Office Action issued in U.S. Appl. No. 15/799,433 dated Oct. 30, 2018.

Non-Final Office Action issued in U.S. Appl. No. 15/799,362 dated Nov. 27, 2018.

Non-Final Office Action issued in U.S. Appl. No. 15/799,156 dated Nov. 27, 2018.

Non-Final Office Action issued in U.S. Appl. No. 15/799,090 dated Jan. 22, 2019.

Final Office Action issued in U.S. Appl. No. 15/799,433 dated Mar. 26, 2019.

Final Office Action issued in U.S. Appl. No. 15/799,156 dated Apr. 17, 2019.

SNIA Storage Networking Industry Association "Common RAID Disk Data Format Specification", Revision 1.2, SNIA Technical Position, Jul. 28, 2006.

Final Office Action issued in U.S. Appl. No. 15/799,362 dated May 23, 2019.

Final Office Action issued in U.S. Appl. No. 15/799,090 dated Jul. 1, 2019.

Non-Final Office Action issued in U.S. Appl. No. 15/799,433 dated Sep. 23, 2019.

Non-Final Office Action issued in U.S. Appl. No. 15/799,362 dated Sep. 23, 2019.

Non-Final Office Action issued in U.S. Appl. No. 15/799,156 dated Sep. 19, 2019.

Non-Final Office Action issued in related U.S. Appl. No. 15/799,090 dated Dec. 13, 2019.

Final Office Action issued in related U.S. Appl. No. 15/799,433 dated Feb. 20, 2020.

Final Office Action issued in related U.S. Appl. No. 15/799,156 dated Feb. 20, 2020.

Final Office Action issued in related U.S. Appl. No. 15/799,362 dated Feb. 20, 2020.

Final Office Action issued in related U.S. Appl. No. 15/799,090 dated Apr. 9, 2020.

Non-Final Office Action issued in related U.S. Appl. No. 15/799,362 dated Sep. 9, 2020.

Non-Final Office Action issued in related U.S. Appl. No. 15/799,156 dated Sep. 24, 2020.

Non-Final Office Action issued in related U.S. Appl. No. 15/799,090 dated Sep. 29, 2020.

Non-Final Office Action issued in related U.S. Appl. No. 15/799,433 dated Oct. 19, 2020.

Final Office Action issued in related U.S. Appl. No. 15/799,362 dated Mar. 17, 2021.

Final Office Action issued in related U.S. Appl. No. 15/799,156 dated Mar. 17, 2021.

Final Office Action issued in related U.S. Appl. No. 15/799,433 dated Mar. 17, 2021.

Final Office Action issued in related U.S. Appl. No. 15/799,090 dated Feb. 23, 2021.

Notice of Allowance issued in U.S. Appl. No. 15/799,156 dated Jun. 14, 2021.

Notice of Allowance issued in U.S. Appl. No. 15/799,362 dated Jun. 16, 2021.

Notice of Allowance issued in U.S. Appl. No. 15/799,433 dated Jul. 6, 2021.

* cited by examiner

TOP-DOWN IO LOAD BALANCING STORAGE SYSTEM AND METHOD

TECHNICAL FIELD

This disclosure relates to storage systems and methods and, more particularly, to storage systems and methods for use within high-availability data storage systems.

BACKGROUND

Storing and safeguarding electronic content is of paramount importance in modern business. Accordingly, various methodologies may be employed to protect such electronic content. One such methodology is to utilize high availability systems to reduce the likelihood of data loss. As would be expected, such high availability systems are often quite complex. Unfortunately, complex system often require complex tasks (e.g., load balancing and wear balancing) to be performed in order to maintain these systems at peak efficiency.

SUMMARY OF DISCLOSURE

In one implementation, a computer-implemented method is executed on a computing device and includes compartmentalizing a plurality of RAID extents, within a RAID system, into a plurality of rotation subgroups. An IO load imbalance condition is sensed in a first rotation subgroup, chosen from the plurality of rotation subgroups, that is associated with a plurality of logical data portions. At least one of the plurality of logical data portions is moved from the first rotation subgroup to a second rotation subgroup, chosen from the plurality of rotation subgroups.

One or more of the following features may be included. The plurality of logical data portions may include a plurality of data slices. Sensing the IO load imbalance condition in the first rotation subgroup may include sensing a logical-layer IO load imbalance condition in the first rotation subgroup, chosen from the plurality of rotation subgroups, that is associated with the plurality of logical data portions. Moving at least one of the plurality of logical data portions from the first rotation subgroup to the second rotation subgroup may include remapping at least one of the plurality of logical data portions from the first rotation subgroup to the second rotation subgroup. Each of the plurality of RAID extents may include a plurality of drive extents. Data from a heavily-utilized drive extent may be moved to an under-utilized drive extent. Each of the plurality of drive extents may be located on a different drive within the RAID system. The RAID system may be a RAID X (Y+Z) system.

In another implementation, a computer program product resides on a computer readable medium and has a plurality of instructions stored on it. When executed by a processor, the instructions cause the processor to perform operations including compartmentalizing a plurality of RAID extents, within a RAID system, into a plurality of rotation subgroups. An IO load imbalance condition is sensed in a first rotation subgroup, chosen from the plurality of rotation subgroups, that is associated with a plurality of logical data portions. At least one of the plurality of logical data portions is moved from the first rotation subgroup to a second rotation subgroup, chosen from the plurality of rotation subgroups.

One or more of the following features may be included. The plurality of logical data portions may include a plurality of data slices. Sensing the IO load imbalance condition in the first rotation subgroup may include sensing a logical-layer IO load imbalance condition in the first rotation subgroup, chosen from the plurality of rotation subgroups, that is associated with the plurality of logical data portions. Moving at least one of the plurality of logical data portions from the first rotation subgroup to the second rotation subgroup may include remapping at least one of the plurality of logical data portions from the first rotation subgroup to the second rotation subgroup. Each of the plurality of RAID extents may include a plurality of drive extents. Data from a heavily-utilized drive extent may be moved to an under-utilized drive extent. Each of the plurality of drive extents may be located on a different drive within the RAID system. The RAID system may be a RAID X (Y+Z) system.

In another implementation, a computing system includes a processor and memory is configured to perform operations including compartmentalizing a plurality of RAID extents, within a RAID system, into a plurality of rotation subgroups. An IO load imbalance condition is sensed in a first rotation subgroup, chosen from the plurality of rotation subgroups, that is associated with a plurality of logical data portions. At least one of the plurality of logical data portions is moved from the first rotation subgroup to a second rotation subgroup, chosen from the plurality of rotation subgroups.

One or more of the following features may be included. The plurality of logical data portions may include a plurality of data slices. Sensing the IO load imbalance condition in the first rotation subgroup may include sensing a logical-layer IO load imbalance condition in the first rotation subgroup, chosen from the plurality of rotation subgroups, that is associated with the plurality of logical data portions. Moving at least one of the plurality of logical data portions from the first rotation subgroup to the second rotation subgroup may include remapping at least one of the plurality of logical data portions from the first rotation subgroup to the second rotation subgroup. Each of the plurality of RAID extents may include a plurality of drive extents. Data from a heavily-utilized drive extent may be moved to an under-utilized drive extent. Each of the plurality of drive extents may be located on a different drive within the RAID system. The RAID system may be a RAID X (Y+Z) system.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
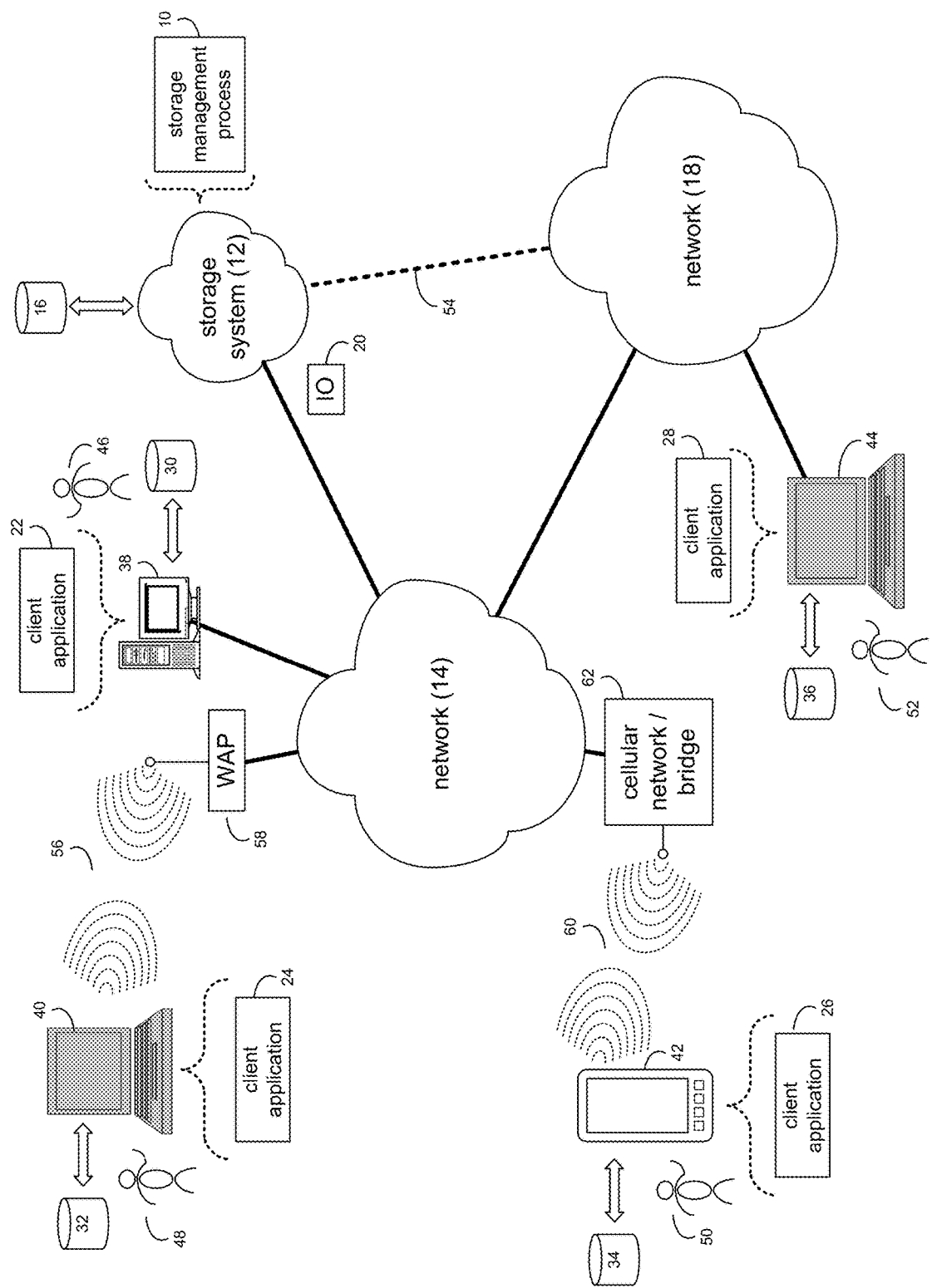
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
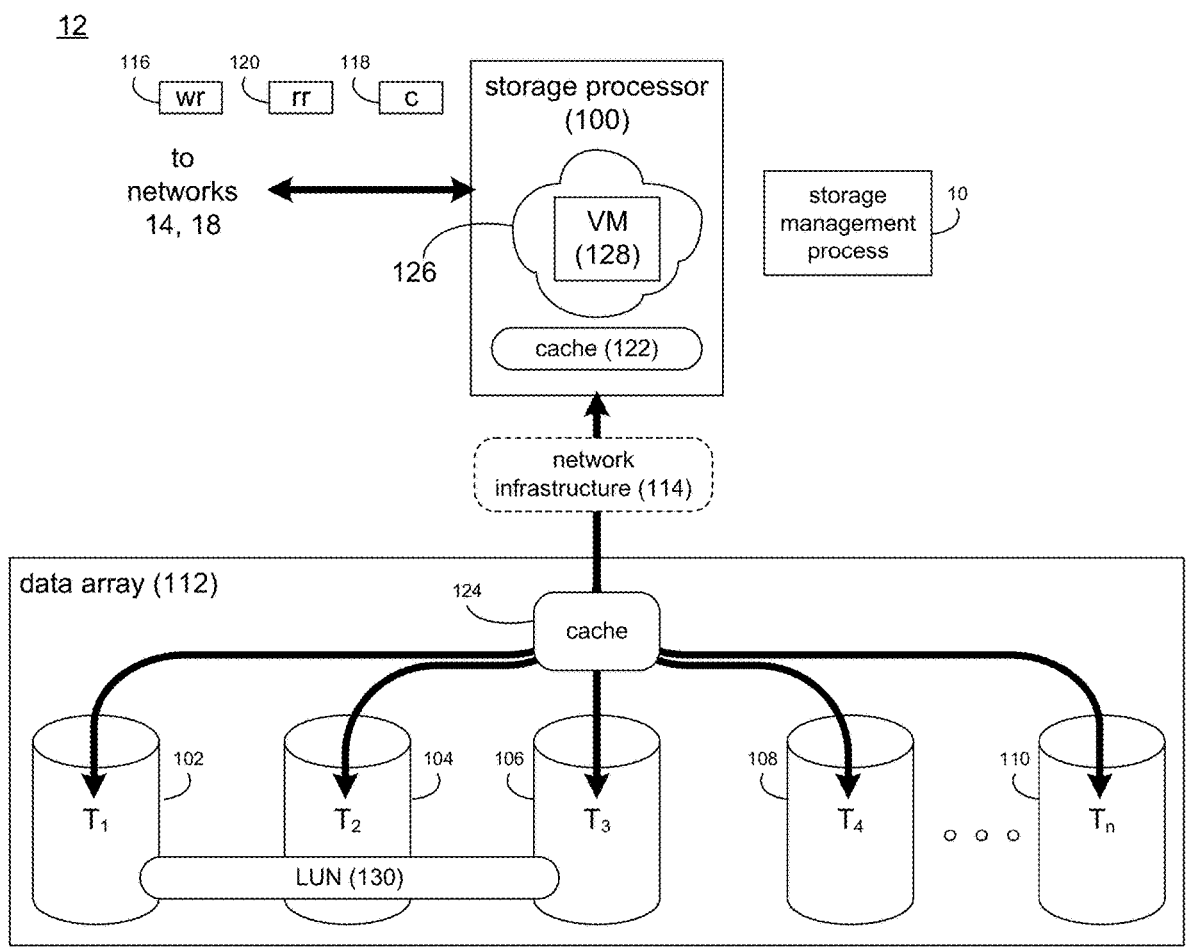
FIG. 2 is a diagrammatic view of another implementation of the storage system of FIG. 1.

Referring also to FIG. 2, there is shown one particular implementation of storage system 12. Storage system 12 may include storage processor 100 and a plurality of storage targets Ti-a (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drive. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various 10 requests (e.g. 10 request 20) may be generated. For example, these IO requests may be sent from client applications 22, 24, 26, 28 to storage system 12. Additionally/alternatively and when storage processor 100 is configured as an application server, these TO requests may be internally generated within storage processor 100. Examples of TO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Depending on the manner in which storage system 12 is configured, storage system 12 may be configured to execute virtual machine operating environment 126. An example of virtual machine operating environment 126 may include but is not limited to a hypervisor, which is an instantiation of an operating/file system that may allow for one or more virtual machines (e.g., virtual machine 128) to operate within a single physical device. Accordingly, the combination of virtual machine operating environment 126 and virtual machine 128 may allow one or more users to access the resources of storage processor 100 (and one or more additional storage processors, not shown) and data array 112 (and one or more additional data arrays, not shown). Through the use or storage system 12 and/or virtual machine operating environment 126, one or more LUNs (e.g., LUN 130) may be defined and exposed to users.

As is known in the art, LUN is an acronym for Logical Unit Number, which is a unique identifier that may designate one or more physical or virtual storage devices that are configured to execute I/O commands on a host computer. Typically, a logical unit number (i.e., a LUN) is assigned when a host scans a SCSI device and discovers a logical unit, wherein the LUN may identify the specific logical unit to e.g., a SCSI initiator (not shown). Although (technically) the term LUN is only the identifying number of a logical unit, the IT industry commonly uses LUN as shorthand to refer to the logical unit itself.

While in this example, LUN 130 is a logical storage unit that is constructed from portions of storage targets 102, 104, 106, this is for illustrative purposes only and is not intended to be a limitation of this disclosure, as other configurations are possible and are considered to be within the scope of this disclosure. For example, LUN 130 may be a portion of a single storage target, an entire storage target, or portions of multiple storage targets. Accordingly, it is understood that LUN 130 may refer to an entire RAID set, a single storage target (or storage partition), or multiple storage targets (or storage partitions).

As discussed above, while in this particular example, storage system 12 is shown to include five storage targets (e.g. storage targets 102, 104, 106, 108, 110), this is for illustrative purposes only and is not intended to be a limitation of this disclosure, wherein the actual number of storage targets included within storage system 12 may be increased or decreased depending upon e.g. the level of redundancy/performance/capacity required. For example, data array 112 of storage system 12 may include dozens of storage targets that may be configured in a mapped RAID configuration.

As is known in the art, a RAID array may be configured in various fashions that may adhere to a RAID X (Y+Z) format, wherein: examples of X may include but are not limited to 5 and 6; examples of Y may include but are not limited to 6, 8, 12 and 14; and examples of Z include but are not limited to 1 and 2. Accordingly, some exemplary implementations of such a RAID array may include but are not limited to RAID 5 (4+1), RAID 5 (8+1), RAID 5 (12+1), RAID 6 (6+2), RAID 6 (8+2), and RAID 6 (14+2). Additionally, it is understood that the above-listed configurations are meant to be illustrative only and not all inclusive. Therefore, different drive counts/combinations (e.g. fewer or more) may be utilized for RAID 5 and RAID 6 configurations and/or different RAID configurations (e.g., RAID 1) may be utilized.

As in known in the art, in a traditional RAID system, the number of storage targets in the system may be defined by the configuration of the RAID array. So if the RAID array is configured in a RAID 5 (4+1) fashion (i.e., four data drives and one parity drive), the system may include five storage targets. However, in a mapped RAID system, the number of storage targets in the system is not limited by the configuration of the RAID array. Accordingly, data array 112 may e.g., include dozens of storage targets and may still be configured in e.g., a RAID 5 (4+1) configuration.

Figure 3:
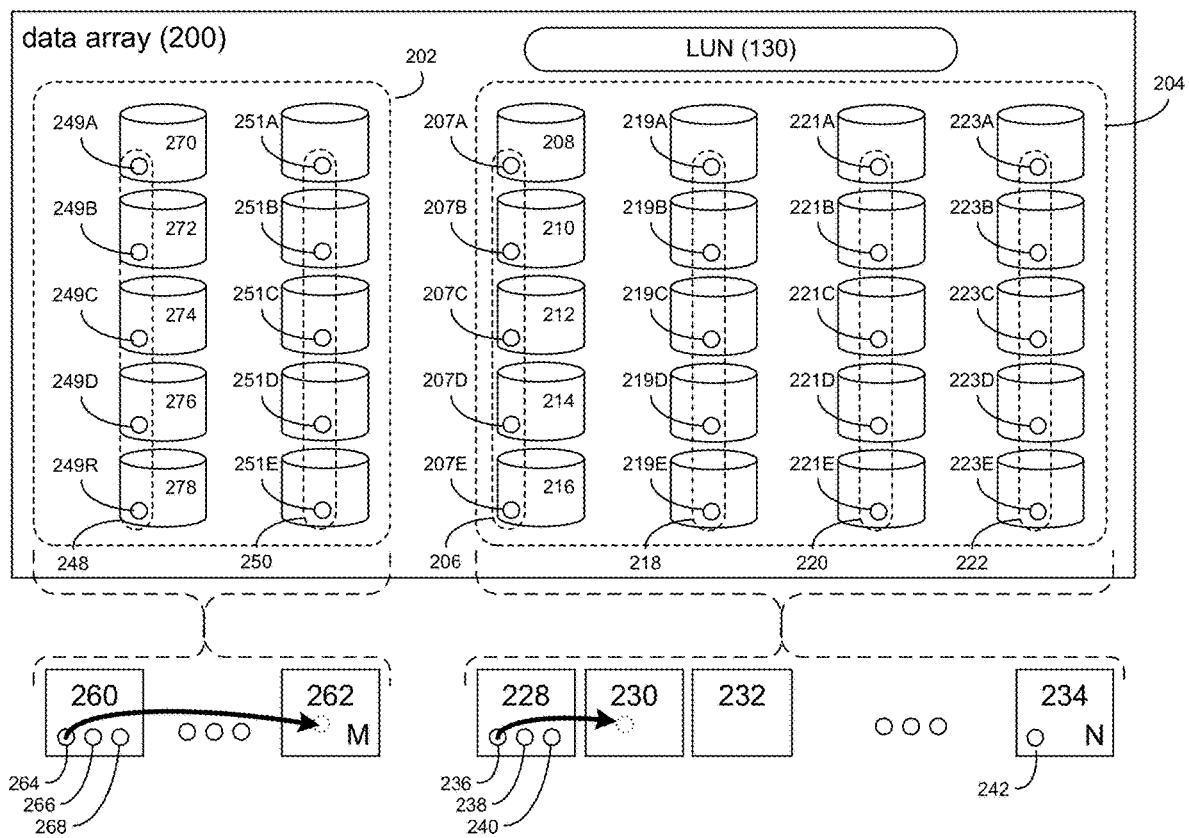
FIG. 3 is a diagrammatic view of a portion of the storage system of FIG. 1.

Referring also to FIG. 3, there is shown one implementation of such a data array, wherein data array 200 is shown to include thirty storage targets. As is known in the art, the storage targets included within a data array may be grouped into different performance tiers. As discussed above, the various storage targets included within storage system 12 may include one or more electro-mechanical hard disk drives (which tend to have comparatively lower performance) and/or one or more solid-state/flash devices (which tend to have comparatively higher performance). Accordingly, data array 200 may be divided into a plurality of performance tiers (e.g., higher performance tier 202 and lower performance tier 204). While data array 200 is shown to include two performance tiers, this is for illustrative purposes only and is not intended to be a limitation of this disclosure, as other configuration are possible and are considered to be within the scope of this disclosure. For example, additional performance tiers may be added to further compartmentalize data array 200.

In this particular example, the ten storage targets shown to be included within higher performance tier 202 may be solid-state/flash devices (which tend to have comparatively higher performance) and/or the twenty storage targets shown to be included within lower performance tier 204 may be electro-mechanical hard disk drives (which tend to have comparatively lower performance). Accordingly, data that is frequently accessed within storage system 12 may be stored within higher performance tier 202, while data that is infrequently accessed within storage system 12 may be stored within lower performance tier 204.

At the physical layer, the storage targets included within storage system 12 may be divided into a plurality of drive extents (e.g., portions), wherein each of these drive extents may have a capacity of 40-50 gigabytes. So if a storage target has a capacity of 5.0 terabytes, this storage target may include 100 drive extents that each have a capacity of 50 gigabytes. Accordingly and in such a situation, the twenty storage targets included within lower performance tier 204 my cumulatively include 2,000 (100×20) drive extents.

The drive extents included within e.g., lower performance tier 204 may be uniquely grouped to form RAID extents. While the following discussion concerns higher performance tier 202 and lower performance tier 204 being configured in a RAID 5 (4+1) fashion, this is for illustrative purposes only and is not intended to be a limitation of this disclosure, as other configurations are possible and are considered to be within the scope of this disclosure. For example, higher performance tier 202 and lower performance tier 204 may be configured in various fashions that may adhere to a RAID X (Y+Z) format.

Accordingly and for this example of a RAID 5 (4+1) configuration, five unique drive extents may be configured to form a single RAID extent, wherein the individual drive extents included within a RAID extent are from different storage targets and are only used in one RAID extent (i.e., a drive extent cannot be used in multiple RAID extents). For example, RAID extent 206 may be constructed using a drive extent (e.g., drive extents 207A, 207B, 207C, 207D, 207E) from each of storage targets 208, 210, 212, 214, 216, (respectively). This forming of RAID extents may be repeated until 400 RAID extents are formed from the 2,000 drive extents included within e.g., lower performance tier 204. Accordingly: RAID extent 218 may be constructed using drive extents 219A, 219B, 219C, 219D, 219E); RAID extent 220 may be constructed using drive extents 221A, 221B, 221C, 221D, 221E); and RAID extent 222 may be constructed using drive extents 223A, 223B, 223C, 223D, 223E). As discussed above, storage system 12 may be configured to execute virtual machine operating environment 126 (e.g., a hypervisor), wherein one or more LUNs (e.g., LUN 130) may be defined and exposed to users. As discussed above, a LUN is a logical representation of physical storage space. For example and through the use of a LUN, physical storage that is scattered across multiple storage targets that may be located in a single or disparate locations may appear to the user as a single storage target.

Accordingly and in order to allow for the utilization of such LUNs, storage management process 10 may be configured to allow for the mapping of such logical storage (e.g., LUN 130) to physical storage (e.g., a drive extent within a storage target). Just as physical storage space (e.g., a storage target) is divided into a plurality of smaller portions (e.g., drive extents), logical storage space (e.g., a LUN) is divided into a plurality of smaller portions (e.g., data slices), wherein each of these data slices may have a capacity of e.g., 256 megabytes and may be mapped to underlying drive extents within the storage targets of (in this example) lower performance tier 204. Specifically, these data slices may be broken down into data stripes that have a common data capacity (e.g., 16 kilobytes, 32 kilobytes, 64 kilobytes, 128 kilobytes, 256 kilobytes or 512 kilobytes).

Figure 4:
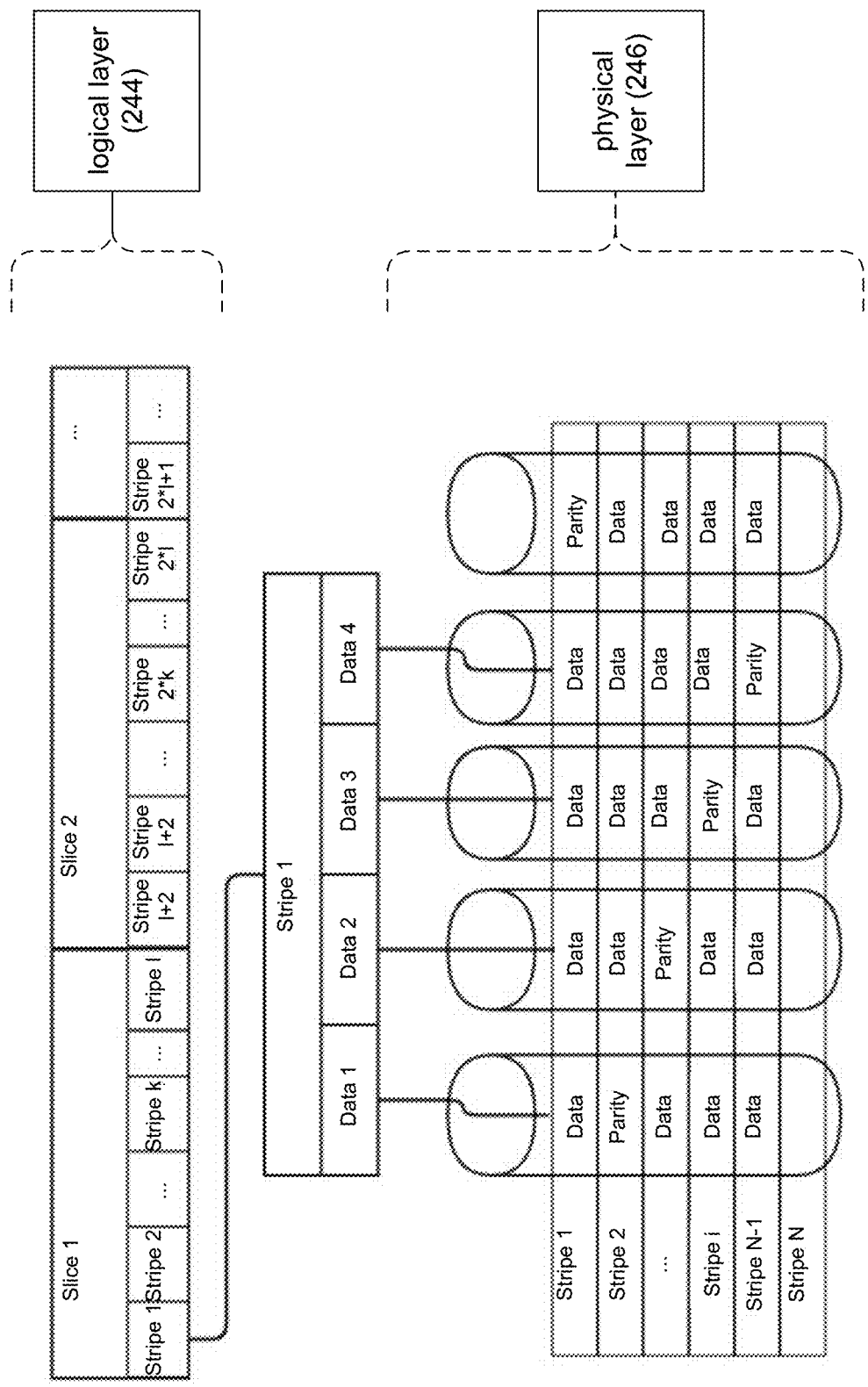
FIG. 4 is a diagrammatic view of a portion of the storage system of FIG. 1.

For example and for illustrative purposes only, a 256 kilobyte data stripe for use within a RAID 5 (4+1) system may include four 64 kilobyte data segments and one 64 kilobytes parity segment (for a total of five segments) that would each be mapped to a distinct drive extent included with a RAID extent (as shown in FIG. 4). Accordingly and in this example, the five segments within a data stripe (e.g., four data segments and one parity segment) may be mapped to the five drive segments within a RAID segment, thus resulting in each of the five segments within a data stripe being written to a distinct storage target. So if a 256 kilobyte data stripe associated with LUN 130 was mapped to RAID extent 206, the first 64 kilobyte data segment may be written to drive extent 207A within storage target 208, the second 64 kilobyte data segment may be written to drive extent 207B within storage target 210, the third 64 kilobyte data segment may be written to drive extent 207C within storage target 212, the fourth 64 kilobyte data segment may be written to drive extent 207D within storage target 214, and the fifth 64 kilobyte parity segment may be written to drive extent 207E within storage target 216.

And when mapping data slices onto storage targets (e.g., the storage targets included within higher performance tier 202 and/or lower performance tier 204), the first 256 kilobyte data stripe of the 256 megabyte data slice may be written to a first RAID extent (which spans five storage targets) . . . and the next 256 kilobyte data stripe of the 256 megabyte data slice may be written to a second RAID extent (which also spans five storage targets) . . . and the next 256 kilobyte data stripe of the 256 megabyte data slice may be written to a third RAID extent (which also spans five storage targets) . . . and so on for 1,000 iterations until the entire 256 megabyte data slice is written to various RAID extents within storage system 12. So being that a 256 megabyte data slice may be written to e.g., higher performance tier 202 and/or lower performance tier 204 as 1,000 separate 256 kilobyte data stripes that are stored on 1,000 separate RAID extents included in higher performance tier 202 and/or lower performance tier 204, it is foreseeable that a single data slice may be spread across every storage target within higher performance tier 202 and/or lower performance tier 204.

Unfortunately and as could be imagined, certain portions of the data stored within higher performance tier 202 and/or lower performance tier 204 may be accessed more frequently than other portions of the stored data. Accordingly, IO load imbalances may occur. For example, assume that the storage targets within lower performance tier 204 are capable of processing 500 input/output operations per second (IOPS). In the event that a storage target (or a portion thereof such as a drive extent) is overloaded and asked to provide e.g., 1,000 IOPS, delays may occur and performance may suffer. However, in the event that only a portion of the storage targets within e.g., lower performance tier 204 are overloaded, some of the load experienced by the overloaded storage targets may be transferred in an attempt to balance the load across a larger cross-section of e.g., lower performance tier 204. While an overload condition is described above as occurring when a specified level of TOPS is exceeded for a storage target, this is for illustrative purposes only and is not intended to be a limitation of this disclosure, as other configurations are possible and are considered to be within the scope of this disclosure. For example, an overload condition may be defined as exceeding a certain write load by a certain threshold. For example, an overload condition may be defined as a storage target exceeding an average write load (in megabytes per second) by a defined percentage (e.g., 10%).

Accordingly and at the physical layer, if one or more drive extents within a storage target are heavily loaded, some or all of those heavily loaded drive extents may be moved to a storage target that is not as heavily loaded. Alternatively and at the logical layer, if one or more drive extents within a storage target are heavily loaded, some or all of the data slices mapped to those heavily loaded drive extents may be remapped to other drive extents that are not as heavily loaded.

Unfortunately, since data slices are mapped to RAID extents that are formed using drive extents from all of the storage targets included within a storage system, the unloading of certain storage targets and/or drive extents may prove difficult.

Movement Between Rotation Subgroups (109168)

Figure 5:
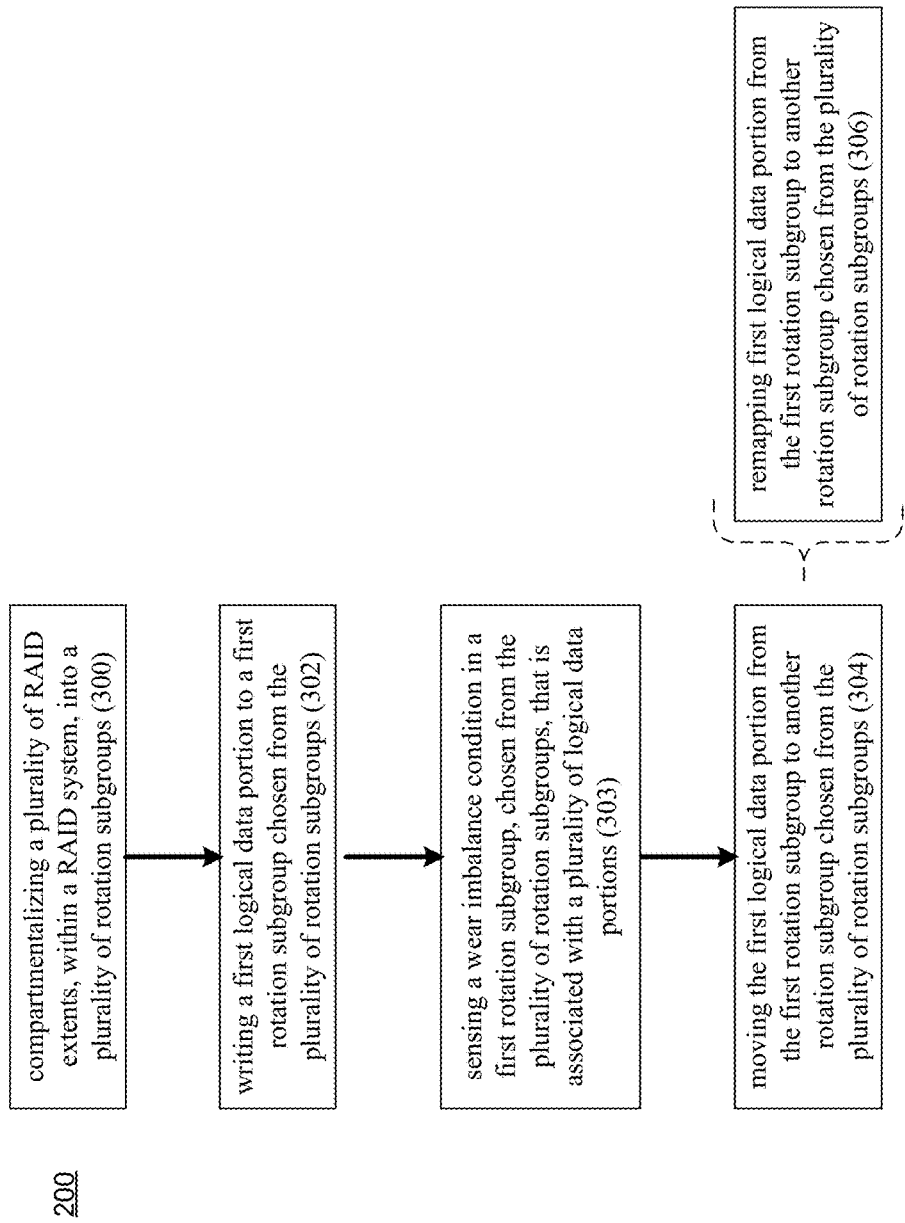
FIG. 5 is a flow chart of the storage management process of FIG. 1.

Referring also to FIG. 5, storage management process 10 may compartmentalize 300 a plurality of RAID extents, within a RAID system, into a plurality of rotation subgroups. As discussed above, the storage targets included within storage system 12 may be divided into a plurality of drive extents (e.g., 40-50 gigabyte portions). So if a storage target has a capacity of 5.0 terabytes, this storage target may include 100 drive extents that each have a capacity of 50 gigabytes. Accordingly, the twenty storage targets included within lower performance tier 204 may cumulatively include 2,000 drive extents (100 drive extents×20 storage targets). In the manner described above, these 2,000 drive extents may be combined into groups of drive extents (from different storage targets) to form 400 RAID extents.

Assume for this example that storage management process 10 compartmentalizes 300 the above-described 400 RAID extents (within lower performance tier 204 of storage system 12) into a plurality of rotation subgroups 1-N (e.g., illustrated by rotation subgroups 228, 230, 232, 234). For example, a typical rotation subgroup may include four RAID extents. Accordingly and in such a situation, the above-described 400 RAID extents may be divided into 100 rotation subgroups (e.g., illustrated by rotation subgroups 228, 230, 232, 234). For this example, assume that RAID extent 206 is included within rotation subgroup 228; RAID extent 218 is included within rotation subgroup 230; RAID extent 220 is included within rotation subgroup 232; and RAID extent 222 is included within rotation subgroup 234.

It is further noted that a rotation subgroup typically tries to contain a drive extent from as many discrete storage targets as possible. However, this may be limited by the ability of having an integral number of RAID extents and the number of storage targets in the drive partition group (e.g., RAID 5 (4+1) extents in a 13-drive drive partition group may result in two RAID extents per rotation group and thus each rotation group may only covers 10 of the 13 drives).

When writing data to storage system 12, storage management process 10 may write 302 a first logical data portion (e.g., data slice 236) to a first rotation subgroup (e.g., rotation subgroup 228) chosen from the plurality of rotation subgroups (e.g., rotation subgroups 228, 230, 232, 234). Accordingly, the first logical data portion (e.g., data slice 236) would be written 302 in its entirety to a single rotation subgroup (namely rotation subgroup 228). Further assume that additional logical data portions (e.g., data slices 238, 240) are also written to rotation subgroup 228.

Assume for this example that rotation subgroup 228 is being used considerably more than rotation subgroups 230, 232, 234. Accordingly, storage management process 10 may sense 303 a wear imbalance condition in a first rotation subgroup (e.g., rotation subgroup 228), chosen from the plurality of rotation subgroups (e.g., rotation subgroups 228, 230, 232, 234), that is associated with a plurality of logical data portions (e.g., data slices 236, 238, 240). Therefore, storage management process 10 may wish to distribute the load being experienced by rotation subgroup 228 amongst some of the other rotation subgroups (e.g., rotation subgroups 230, 232, 234). Accordingly, storage management process 10 may move 304 the first logical data portion (e.g., data slice 236) from the first rotation subgroup (e.g., rotation subgroup 228) to another rotation subgroup (e.g., rotation subgroup 230) chosen from the plurality of rotation subgroups (e.g., rotation subgroups 228, 230, 232, 234). Since data slice 236 is now associated with an underutilized rotation subgroup (e.g., rotation subgroup 230) and is no longer associated with the overutilized rotation subgroup (e.g., rotation subgroup 228), the load may be more evenly spread between rotation subgroups. Further, storage management process 10 may write a second logical data portion (e.g., data slice 242) to a second rotation subgroup (e.g., rotation subgroup 234) chosen from the plurality of rotation subgroups (e.g., rotation subgroups 228, 230, 232, 234).

When moving 304 the first logical data portion (e.g., data slice 236) from the first rotation subgroup (e.g., rotation subgroup 228) to another rotation subgroup (e.g., rotation subgroup 230) chosen from the plurality of rotation subgroups (e.g., rotation subgroups 228, 230, 232, 234), storage management process 10 may remap 306 the first logical data portion (e.g., data slice 236) from the first rotation subgroup (e.g., rotation subgroup 228) to another rotation subgroup (e.g., rotation subgroup 230) chosen from the plurality of rotation subgroups (e.g., rotation subgroups 228, 230, 232, 234).

Accordingly, since the 400 RAID extents within lower performance tier 204 of storage system 12 are grouped into a plurality of rotation subgroups (e.g., illustrated by rotation subgroups 228, 230, 232, 234), storage management process 10 may distribute the load experienced by lower performance tier 204 by: moving portions of that load (e.g., data slices) from overutilized rotation subgroups to underutilized rotation subgroups and/or directing new portions of that load (e.g., new data slices) to underutilized rotation subgroups.

As shown in FIG. 4, the various portions of storage system 12 (e.g., higher performance tier 202 and/or lower performance tier 204) may include two distinct layers . . . logical layer 244 (that includes logical storage targets such as LUN 130) and physical layer 246 (that includes physical storage targets such as drive extents 208, 210, 212, 214, 216, wherein (and as discussed above) the logical storage targets may be mapped to the physical storage targets.

Top-Down IO Load Balancing (109169)

As discussed above, the storage targets included within storage system 12 (e.g., higher-performance tier 202 and/or lower performance tier 204) may have a defined maximum number of IOPS. For example, a specific storage target within higher-performance tier 202 and/or lower performance tier 204 may define the maximum quantity of IOPS at 500 (i.e., 500 input/output operations per second), wherein asking for the storage target (or a drive extent included therein) to process more than 500 TOPS may result in the storage target (or a drive extent included therein) being overutilized (e.g., overloaded). Accordingly, storage management process 10 may be configured to perform Top-Down IO Load Balancing.

Figure 6:
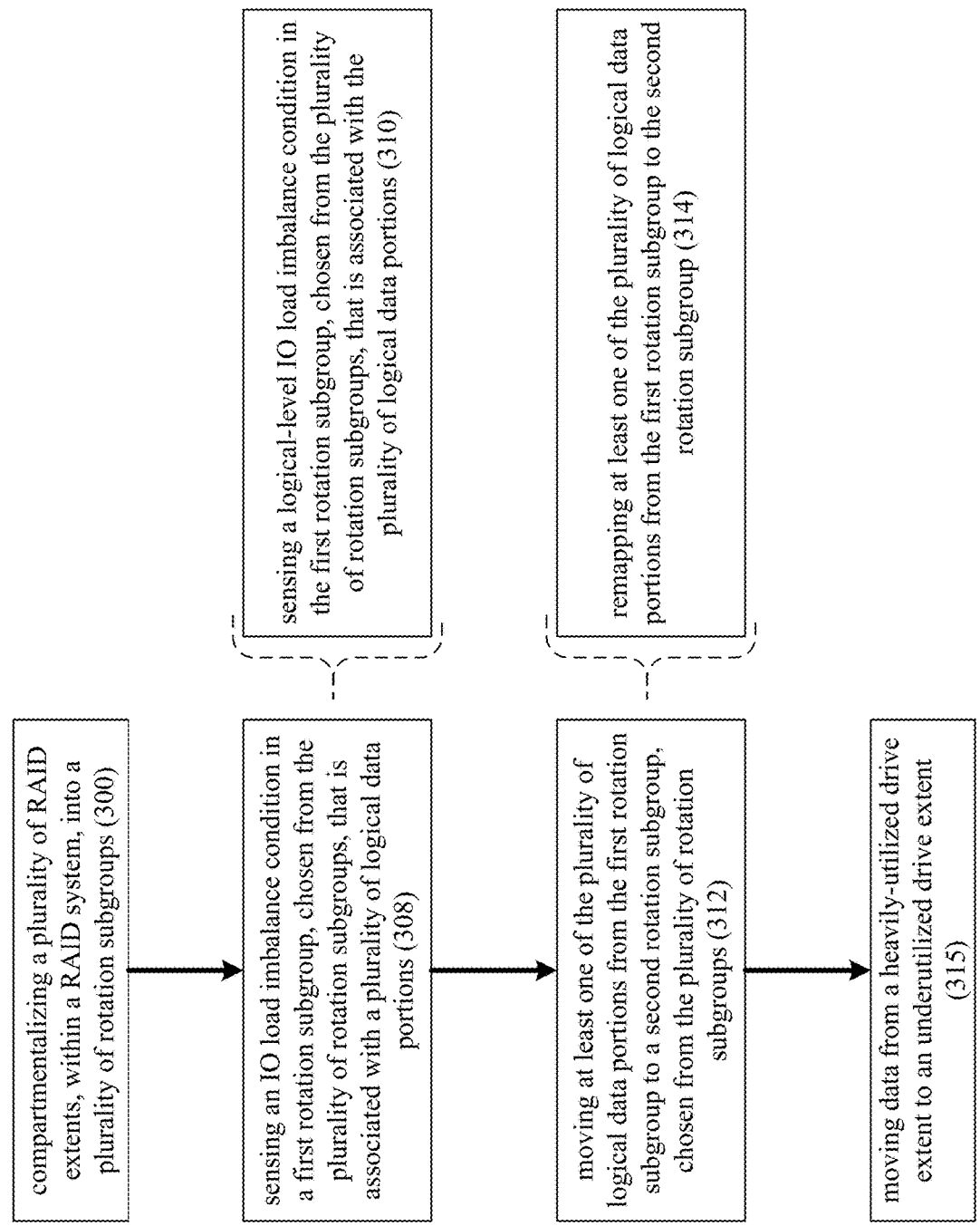
FIG. 6 is another flow chart of the storage management process of FIG. 1.

Referring also to FIG. 6 and as discussed above, storage management process 10 may compartmentalize 300 a plurality of RAID extents (e.g., 400 RAID extents within lower performance tier 204 of storage system 12) into a plurality of subgroups (e.g., illustrated by rotation subgroups 228, 230, 232, 234).

Storage management process 10 may sense 308 an IO load imbalance condition in a first rotation subgroup, chosen from the plurality of rotation subgroups, that is associated with a plurality of logical data portions (e.g., a plurality of data slices). For example, storage management process 10 may sense 308 an IO load imbalance condition in rotation subgroup 228, chosen from the plurality of rotation subgroups (e.g., rotation subgroups 228, 230, 232, 234), that is associated with a plurality of logical data portions (e.g., data slices 236, 238, 240).

When sensing 308 the IO load imbalance condition in the first rotation subgroup (e.g., rotation subgroup 228), storage management process 10 may sense 310 a logical-layer IO load imbalance condition in the first rotation subgroup (e.g., rotation subgroup 228), chosen from the plurality of rotation subgroups (e.g., rotation subgroups 228, 230, 232, 234), that is associated with the plurality of logical data portions (e.g., data slices 236, 238, 240). For example, storage management process 10 may sense 310 the IO load imbalance condition in rotation subgroup 228 at the logical layer without any knowledge of IO loading at the physical layer.

In response to sensing 308 an IO load imbalance condition, storage management process 10 may move 312 at least one of the plurality of logical data portions (e.g., data slice 236) from the first rotation subgroup (e.g., rotation subgroup 228) to a second rotation subgroup (e.g., rotation subgroup 230), chosen from the plurality of rotation subgroups (e.g., rotation subgroups 228, 230, 232, 234).

When moving 312 at least one of the plurality of logical data portions (e.g., data slice 236) from the first rotation subgroup (e.g., rotation subgroup 228) to a second rotation subgroup (e.g., rotation subgroup 230), storage management process 10 may remap 314 at least one of the plurality of logical data portions (e.g., data slice 236) from the first rotation subgroup (e.g., rotation subgroup 228) to a second rotation subgroup (e.g., rotation subgroup 230).

Additionally, storage management process 10 may move 315 data at the physical layer from one drive extent to another drive extent to address overloading/imbalance issues. For example and when sensing 308 the overloading/imbalance condition in rotation subgroup 228, storage management process 10 may identify a specific drive extent (e.g., drive extent 207A within RAID extent 206) that is being heavily utilized. Accordingly, storage management process 10 may then move 315 data from this heavily-utilized drive extent to an underutilized drive extent. For example, storage management process 10 may move 315 (e.g., by copying) the data from the heavily utilized drive extent (e.g., drive extent 207A) to a new drive extent (e.g., an unused or unassigned drive extent) on an underutilized storage target, wherein this new drive extent on this under-utilized storage target will replace the heavily utilized drive extent (e.g., drive extent 207A) within RAID extent 206, thus addressing the IO load imbalance condition within e.g., rotation subgroup 228. Accordingly, the data remains in the same RAID extent (e.g., RAID extent 206) in the same rotation subgroup (e.g., rotation subgroup 228); the only change being the actual drive extent (and thus the actual storage target) containing the data.

As discussed above, storage management process 10 may be configured to allow for the mapping of logical storage to physical storage. Accordingly, data slice 236 may be initially mapped to a specific drive extent within a specific rotation subgroup (e.g., rotation subgroup 228) and, upon sensing 308 the IO load imbalance condition in rotation subgroup 228, storage management process 10 may remap 314 data slice 236 from rotation subgroup 228 to rotation subgroup 230.

Bottom-Up IO Load Balancing (109171)

Storage management process 10 may be configured to perform Bottom-Up IO Load Balancing.

Figure 7:
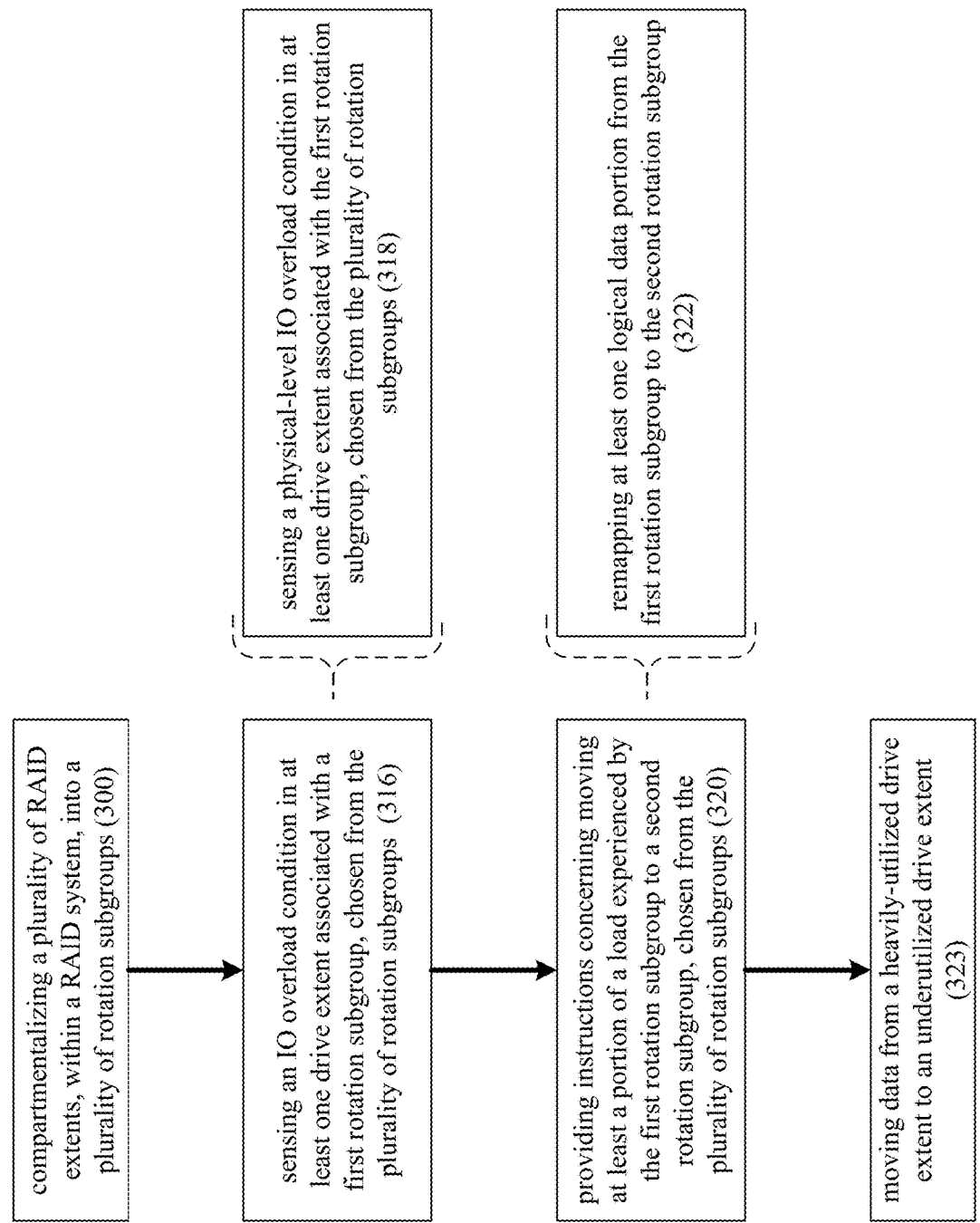
FIG. 7 is another flow chart of the storage management process of FIG. 1.

As discussed above and at the physical layer, the storage targets included within storage system 12 may be divided into a plurality of drive extents (e.g., portions), wherein these drive extents may be uniquely grouped to form RAID extents. Referring also to FIG. 7 and as discussed above, storage management process 10 may compartmentalize 300 a plurality of RAID extents (e.g., 400 RAID extents within lower performance tier 204 of storage system 12) into a plurality of rotation subgroups (e.g., illustrated by rotation subgroups 228, 230, 232, 234). Accordingly, as a unique group of drive extents form a RAID extent, and a unique group of RAID extents form a rotation subgroup, storage management process 10 may associate an 10 overload condition within a drive extent to a particular rotation subgroup.

Accordingly, storage management process 10 may sense 316 an 10 overload condition in at least one drive extent associated with a first rotation subgroup (e.g., rotation subgroup 228), chosen from the plurality of rotation subgroups (e.g., rotation subgroups 228, 230, 232, 234). For example and when sensing 316 the IO overload condition in at least one drive extent associated with the first rotation subgroup (e.g., rotation subgroup 228), storage management process 10 may sense 318 a physical-layer IO overload condition in at least one drive extent associated with the first rotation subgroup, chosen from the plurality of rotation subgroups.

As discussed above, RAID extent 206 may be constructed using a drive extent (e.g., drive extents 207A, 207B, 207C, 207D, 207E) from each of storage targets 208, 210, 212, 214, 216 (respectively). For the following example, assume that RAID extent 206 was assigned to rotation subgroup 228, RAID extent 218 was assigned to rotation subgroup 230, RAID extent 220 was assigned to rotation subgroup 232, and RAID extent 222 was assigned to rotation subgroup 234. Further assume that drive extent 207A is being asked to perform 750 TOPS, wherein (and as discussed above) this drive extent is defined as having a maximum IOPS quantity of 500. Accordingly, drive extent 207A is being overutilized (i.e., overloaded). Therefore, storage management process 10 may sense 316 this IO overload condition of drive extent 207A that is associated with rotation subgroup 228.

In response to sensing 316 this IO overload condition, storage management process 10 may provide 320 instructions concerning moving at least a portion of a load experienced by rotation subgroup 228 to a second rotation subgroup, chosen from the plurality of rotation subgroups (e.g., rotation subgroups 228, 230, 232, 234). Since drive extents are physical in nature, storage management process 10 may be aware of which drive extents are underutilized. And being that each drive extent is uniquely associated with a RAID extent, which is uniquely associated with a rotation subgroup, storage management process 10 may provide 320 instructions concerning moving at least a portion of the load experienced by rotation subgroup 228 to e.g., rotation subgroup 230 (which contains one or more underutilized drive extents).

When moving at least a portion of a load experienced by the first rotation subgroup (e.g., rotation subgroup 228) to the second rotation subgroup (e.g., rotation subgroup 230), storage management process 10 may remap 322 at least one logical data portion (e.g., a data slice) from the first rotation subgroup to the second rotation subgroup. For example, storage management process 10 may remap 322 data slice 236 from rotation subgroup 228 to rotation subgroup 230.

Additionally, storage management process 10 may move 323 data at the physical layer from one drive extent to another drive extent to address overloading/imbalance issues. For example and when sensing 316 the overloading/imbalance condition in rotation subgroup 228, storage management process 10 may identify a specific drive extent (e.g., drive extent 207A within RAID extent 206) that is being heavily utilized. Accordingly, storage management process 10 may then move 323 data from this heavily-utilized drive extent to an underutilized drive extent. For example, storage management process 10 may move 323 (e.g., by copying) the data from the heavily utilized drive extent (e.g., drive extent 207A) to a new drive extent (e.g., an unused or unassigned drive extent) on an underutilized storage target, wherein this new drive extent on this under-utilized storage target will replace the heavily utilized drive extent (e.g., drive extent 207A) within RAID extent 206, thus addressing the IO overload condition within e.g., rotation subgroup 228. Accordingly, the data remains in the same RAID extent (e.g., RAID extent 206) in the same rotation subgroup (e.g., rotation subgroup 228); the only change being the actual drive extent (and thus the actual storage target) containing the data.

Top-Down Wear-Levelling (109170)

As discussed above, examples of storage targets 102, 104, 106, 108, 110 may include one or more electro-mechanical hard disk drives and/or one or more solid-state/flash devices. As is known in the art, solid-state/flash devices are capable of handling a finite number of write operations, wherein the manufacturers of these solid-state/flash devices often provide a warranty concerning the number of write operations that these solid-state/flash devices can handle. For example, assume that higher-performance tier 202 includes solid-state/flash devices that can handle 10,000 write operations. Further assume that the manufacture of storage system 12 provides a five year warranty.

Accordingly and in order for the solid-state/flash devices included within higher-performance tier 202 to survive this five year warranty period, the write operations handled by each of the solid-state/flash devices should be under 2,000 write operations per year. Accordingly, storage management process 10 may monitor the quantity of write operations handled by each of the solid-state/flash devices. This monitoring of the quantity of write operations may be averaged over a defined period of time (e.g., a day, a week, a month, a quarter, a year) and then compared to acceptable levels of use. For example, if a total of 10,000 write operations over the course of 5 years (i.e., 500 write operations every three months) is an acceptable level of use for a solid-state/flash device, if storage management process 10 determines that (on average) 750 write operations were performed per quarter over the last two quarters, this current use is exceeding the acceptable use by 50%. Accordingly, wear levelling may be needed in order to address this over usage. Therefore, storage management process 10 may be configured to perform Top-Down Wear-Levelling.

For the following discussion, assume that the ten solid-state/flash devices included within higher-performance tier 202 each contain 100 drive extents, resulting in a total of 1,000 (100×10) drive extents within higher performance tier 202. These 1,000 drive extents may be combined in unique groups to form 200 RAID extents (e.g., RAID extent 248 from drive extents 249A, 249B, 249C, 249D, 249E and RAID extent 250 from drive extents 251A, 251B, 251C, 251D, 251E).

Figure 8:
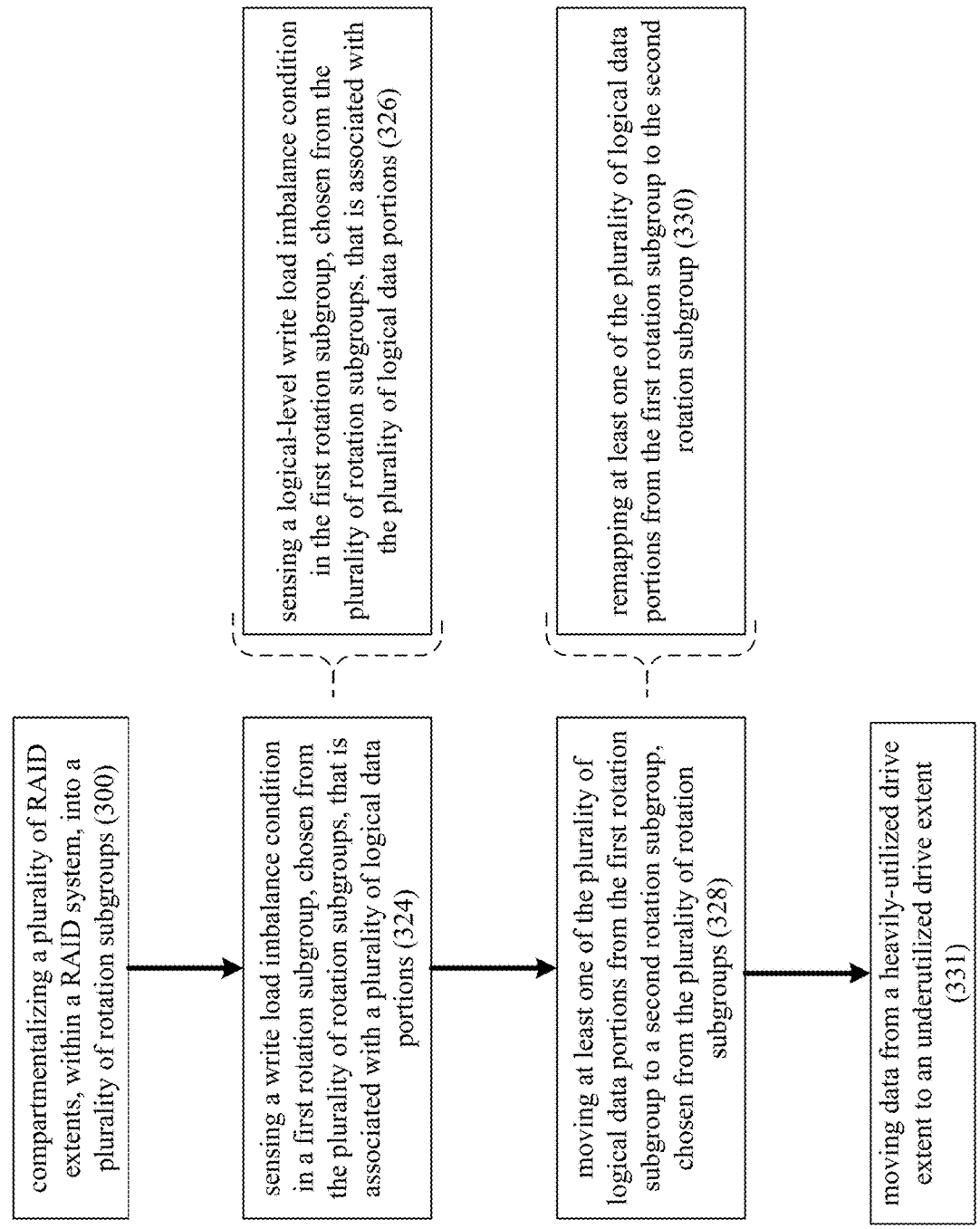
FIG. 8 is another flow chart of the storage management process of FIG. 1.

Referring also to FIG. 8, storage management process 10 may compartmentalize 300 a plurality of RAID extents (e.g., 200 RAID extents within higher performance tier 202 of storage system 12) into a plurality of subgroups 1-M (e.g., illustrated by rotation subgroups 260, 262). For example, a typical rotation subgroup may include four RAID extents. Accordingly and in such a situation, the above-described 200 RAID extents may be divided into 50 rotation subgroups (e.g., illustrated by rotation subgroups 260, 262). For this example, assume that RAID extent 248 was assigned to rotation subgroup 260; and RAID extent 250 was assigned to rotation subgroup 262.

Storage management process 10 may sense 324 a write load imbalance condition in a first rotation subgroup, chosen from the plurality of rotation subgroups, that is associated with a plurality of logical data portions (e.g., a plurality of data slices). For example, storage management process 10 may sense 324 a write load imbalance condition in rotation subgroup 260, chosen from the plurality of rotation subgroups (e.g., rotation subgroups 260, 262), that is associated with a plurality of logical data portions (e.g., data slices 264, 266, 268).

When sensing 324 the write load imbalance condition in the first rotation subgroup (e.g., rotation subgroup 260), storage management process 10 may sense 326 a logical-layer write load imbalance condition in the first rotation subgroup (e.g., rotation subgroup 260), chosen from the plurality of rotation subgroups (e.g., rotation subgroups 260, 262), that is associated with the plurality of logical data portions (e.g., data slices 264, 266, 268). For example, storage management process 10 may sense 326 the write load imbalance condition in rotation subgroup 260 at the logical layer without any knowledge of wear balancing at the physical layer.

In response to sensing 324 a write load imbalance condition, storage management process 10 may move 328 at least one of the plurality of logical data portions (e.g., data slice 264) from the first rotation subgroup (e.g., rotation subgroup 260) to a second rotation subgroup (e.g., rotation subgroup 262), chosen from the plurality of rotation subgroups (e.g., rotation subgroups 260, 262).

When moving 328 at least one of the plurality of logical data portions (e.g., data slice 264) from the first rotation subgroup (e.g., rotation subgroup 260) to the second rotation subgroup (e.g., rotation subgroup 262), storage management process 10 may remap 330 at least one of the plurality of logical data portions from the first rotation subgroup (e.g., rotation subgroup 260) to a second rotation subgroup (e.g., rotation subgroup 262).

Additionally, storage management process 10 may move 331 data at the physical layer from one drive extent to another drive extent to address overloading/imbalance issues. For example and when sensing 324 the overloading/imbalance condition in rotation subgroup 228, storage management process 10 may identify a specific drive extent (e.g., drive extent 207A within RAID extent 206) that is being heavily utilized. Accordingly, storage management process 10 may then move 331 data from this heavily-utilized drive extent to an underutilized drive extent. For example, storage management process 10 may move 331 (e.g., by copying) the data from the heavily utilized drive extent (e.g., drive extent 207A) to a new drive extent (e.g., an unused or unassigned drive extent) on an underutilized storage target, wherein this new drive extent on this underutilized storage target will replace the heavily utilized drive extent (e.g., drive extent 207A) within RAID extent 206, thus addressing the write load imbalance condition within e.g., rotation subgroup 228. Accordingly, the data remains in the same RAID extent (e.g., RAID extent 206) in the same rotation subgroup (e.g., rotation subgroup 228); the only change being the actual drive extent (and thus the actual storage target) containing the data.

As discussed above, storage management process 10 may be configured to allow for the mapping of logical storage to physical storage. Accordingly, data slice 264 may be initially mapped to a specific drive extent within a specific rotation subgroup (e.g., rotation subgroup 260) and, upon sensing 324 the write load imbalance condition in rotation subgroup 260, storage management process 10 may remap 330 data slice 264 from rotation subgroup 260 to rotation subgroup 262.

Bottom-Up Wear-Levelling (109172)

Storage management process 10 may be configured to perform Bottom-Up Wear-Levelling.

Figure 9:
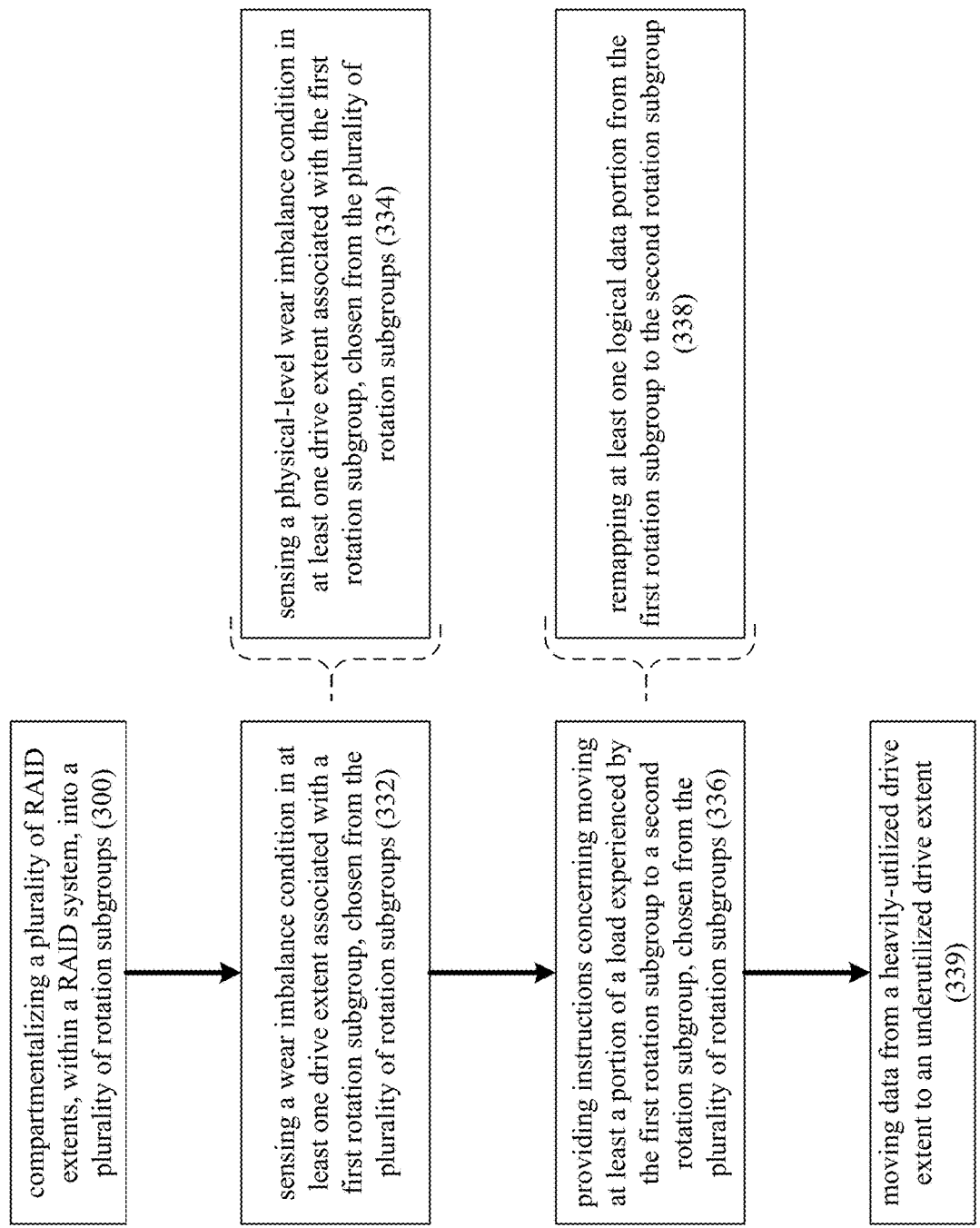
FIG. 9 is another flow chart of the storage management process of FIG. 1.

As discussed above and at the physical layer, the storage targets included within storage system 12 may be divided into a plurality of drive extents (e.g., portions), wherein these drive extents may be uniquely grouped to form RAID extents. Referring also to FIG. 9 and as discussed above, storage management process 10 may compartmentalize 300 a plurality of RAID extents (e.g., 200 RAID extents within higher performance tier 202 of storage system 12) into a plurality of rotation subgroups (e.g., illustrated by rotation subgroups 260, 262). Accordingly, as a unique group of drive extents form a RAID extent, and a unique group of RAID extents form a rotation subgroup, storage management process 10 may associate a wear imbalance condition within a drive extent to a particular rotation subgroup.

Accordingly, storage management process 10 may sense 332 a wear imbalance condition in at least one drive extent associated with a first rotation subgroup (e.g., rotation subgroup 260), chosen from the plurality of rotation subgroups (e.g., rotation subgroups 260, 262). For example and when sensing 332 the wear imbalance condition in at least one drive extent associated with the first rotation subgroup (e.g., rotation subgroup 260), storage management process 10 may sense 334 a physical-layer wear imbalance condition in at least one drive extent associated with the first rotation subgroup, chosen from the plurality of rotation subgroups.

As discussed above, RAID extent 248 may be constructed using a drive extent (e.g., drive extents 249A, 249B, 249C, 249D, 249E) from each of storage targets 270, 272, 274, 276, 278 (respectively). For the following example, assume that RAID extent 248 was assigned to rotation subgroup 260 and that RAID extent 250 was assigned to rotation subgroup 262. Further assume that storage management process 10 determines that the current use of drive extent 249A is 50% greater than its recommended use (e.g., 750 write operations were performed per quarter over the last two quarters, as opposed to 500 write operation). Accordingly, wear levelling may be needed in order to address this over usage. Therefore, storage management process 10 may sense 332 this wear imbalance condition of drive extent 249A that is associated with rotation subgroup 260.

In response to sensing 332 this wear imbalance condition, storage management process 10 may provide 336 instructions concerning moving at least a portion of a load experienced by the rotation subgroup 260 to a second rotation subgroup, chosen from the plurality of rotation subgroups (e.g., rotation subgroups 260, 262).

Since drive extents are physical in nature, storage management process 10 may be aware of which drive extents are underutilized. And being that each drive extent is uniquely associated with a RAID extent, which is uniquely associated with a rotation subgroup, storage management process 10 may provide 336 instructions concerning moving at least a portion of the load experienced by rotation subgroup 260 to e.g., rotation subgroup 262 (which contains one or more underutilized drive extents).

When moving at least a portion of a load experienced by the first rotation subgroup (e.g., rotation subgroup 260) to the second rotation subgroup (e.g., rotation subgroup 262), storage management process 10 may remap 338 at least one logical data portion (e.g., a data slice) from the first rotation subgroup to the second rotation subgroup. For example, storage management process 10 may remap 338 data slice 264 from rotation subgroup 260 to rotation subgroup 262.

Additionally, storage management process 10 may move 339 data at the physical layer from one drive extent to another drive extent to address overloading/imbalance issues. For example and when sensing 332 the overloading/imbalance condition in rotation subgroup 228, storage management process 10 may identify a specific drive extent (e.g., drive extent 207A within RAID extent 206) that is being heavily utilized. Accordingly, storage management process 10 may then move 339 data from this heavily-utilized drive extent to an underutilized drive extent. For example, storage management process 10 may move 339 (e.g., by copying) the data from the heavily utilized drive extent (e.g., drive extent 207A) to a new drive extent (e.g., an unused or unassigned drive extent) on an underutilized storage target, wherein this new drive extent on this under-utilized storage target will replace the heavily utilized drive extent (e.g., drive extent 207A) within RAID extent 206, thus addressing the wear imbalance condition within e.g., rotation subgroup 228. Accordingly, the data remains in the same RAID extent (e.g., RAID extent 206) in the same rotation subgroup (e.g., rotation subgroup 228); the only change being the actual drive extent (and thus the actual storage target) containing the data.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
   dividing a plurality of storage targets into a plurality of drive extents with an equal, pre-defined capacity, wherein the plurality of storage targets includes a plurality of drives;
   defining a plurality of Redundant Array of Independent Disks (RAID) extents from the plurality of drive extents, wherein the plurality of RAID extents includes a first set of RAID extents with a plurality of drive extents from different storage targets with a first performance level and a second set of RAID extents with a plurality of drive extents from different storage targets with a second performance level, wherein each of the plurality of drive extents are only included in one RAID extent;
   pre-defining a plurality of rotation subgroups, wherein pre-defining a plurality of rotation subgroups comprises compartmentalizing the plurality of RAID extents, within a mapped RAID system, into a plurality of rotation, wherein the first set of RAID extents are compartmentalized into a first plurality of rotation subgroups and the second set of RAID extents are compartmentalized into a second plurality of rotation subgroups, wherein a number of the plurality of storage targets in the mapped RAID system is not limited by a RAID level of the plurality of RAID extents, wherein the first plurality of rotation subgroups is associated with a high performance tier comprised of a plurality of rotation subgroups that do not share any drive extents in common and the second plurality of rotation subgroups is associated with a low performance tier of a plurality of rotation subgroups that do not share any drive extents in common, wherein each rotation subgroup within the performance tiers is comprised of an equal number of RAID extents greater than one;
   writing a plurality of logical data portions in their entirety to a single rotation subgroup, wherein writing a plurality of logical data portions in their entirety to a single rotation subgroup includes writing a first logical data portion in its entirety to a first rotation subgroup within the first plurality of rotation subgroups;
   sensing, in response to writing a first logical data portion in its entirety to a first rotation subgroup within the first plurality of rotation subgroups, an Input/Output (TO) imbalance condition in one or more rotation subgroups of the first plurality of rotation subgroups that is associated with a plurality of logical data portions;
   moving at least one of the plurality of logical data portions from one of the rotation subgroups of the first plurality of rotation subgroups to another rotation subgroup of the first plurality of rotation subgroups; and
   directing one or more new data slices to one or more underutilized rotation subgroups of the second plurality of rotation subgroups.

2. The computer-implemented method of claim 1 wherein the plurality of logical data portions includes a plurality of data slices.

3. The computer-implemented method of claim 1 wherein sensing the IO imbalance condition in the first plurality of rotation subgroup includes:
   sensing, at the logical layer, an IO imbalance condition in one of the rotation subgroups of the first plurality of rotation subgroups that is associated with the plurality of logical data portions.

4. The computer-implemented method of claim 1 wherein moving at least one of the plurality of logical data portions from the first rotation subgroup to a second rotation subgroup, chosen from the plurality of rotation subgroups includes:
   remapping at least one of the plurality of logical data portions from the first rotation subgroup to the second rotation subgroup.

5. The computer-implemented method of claim 1 further comprising:
   moving data from a heavily-utilized drive extent to an underutilized drive extent.

6. The computer-implemented method of claim 1 wherein:
   the RAID system is a RAID X (Y+Z) system, wherein X is a number representing a RAID level of the RAID system, Y represents a number of data drives and Z represents a number of parity drives.

7. The computer-implemented method of claim 1 wherein each rotation subgroup within the first plurality of rotation subgroups is configured to contain a maximum number of drive extents from the plurality of drive extents from the plurality of storage targets.

8. The computer-implemented method of claim 7 wherein the maximum number of drive extents from the plurality of drive extents contained in each rotation subgroup within the first plurality of rotation subgroups is limited by an integral number of RAID extents present from the plurality of RAID extents.

9. The computer-implemented method of claim 1 wherein moving at least one of the plurality of logical data portions from one of the rotation subgroups of the first plurality of rotation subgroups to another rotation subgroup of the first plurality of rotation subgroups includes moving data at a physical layer from one drive extent to another drive extent.

10. The computer-implemented method of claim 1 wherein sensing an Input/Output (IO) imbalance condition in one or more rotation subgroups of the first plurality of rotation subgroups that is associated with a plurality of logical data portions includes determining whether a pre-defined maximum number of Input/Output Operations Per Second (IPOS) in a high performance tier associated with the first plurality of rotation subgroups is exceeded.

11. The computer-implemented method of claim 1 wherein moving at least one of the plurality of logical data portions from one of the rotation subgroups of the first plurality of rotation subgroups to another rotation subgroup of the first plurality of rotation subgroups includes reassigning the at least one of the plurality of logical data portions from one of the rotation subgroups of the first plurality of rotation subgroups to another rotation subgroup of the first plurality of rotation subgroups.

12. A computer program product residing on a non-transitory computer readable medium having a plurality of instructions stored thereon which, when executed by a processor, cause the processor to perform operations comprising:
dividing a plurality of storage targets into a plurality of drive extents with an equal, pre-defined capacity, wherein the plurality of storage targets includes a plurality of drives;
defining a plurality of Redundant Array of Independent Disks (RAID) extents from the plurality of drive extents, wherein the plurality of RAID extents includes a first set of RAID extents with a plurality of drive extents from different storage targets with a first performance level and a second set of RAID extents with a plurality of drive extents from different storage targets with a second performance level, wherein each of the plurality of drive extents are only included in one RAID extent;
pre-defining a plurality of rotation subgroups, wherein pre-defining a plurality of rotation subgroups comprises compartmentalizing the plurality of RAID extents, within a mapped RAID system, into a plurality of rotation, wherein the first set of RAID extents are compartmentalized into a first plurality of rotation subgroups and the second set of RAID extents are compartmentalized into a second plurality of rotation subgroups, wherein a number of the plurality of storage targets in the mapped RAID system is not limited by a RAID level of the plurality of RAID extents, wherein the first plurality of rotation subgroups is associated with a high performance tier comprised of a plurality of rotation subgroups that do not share any drive extents in common and the second plurality of rotation subgroups is associated with a low performance tier of a plurality of rotation subgroups that do not share any drive extents in common, wherein each rotation subgroup within the performance tiers is comprised of an equal number of RAID extents greater than one;
writing a plurality of logical data portions in their entirety to a single rotation subgroup, wherein writing a plurality of logical data portions in their entirety to a single rotation subgroup includes writing a first logical data portion in its entirety to a first rotation subgroup within the first plurality of rotation subgroups;
sensing, in response to writing a first logical data portion in its entirety to a first rotation subgroup within the first plurality of rotation subgroups, an Input/Output (IO) imbalance condition in one or more rotation subgroups of the first plurality of rotation subgroups that is associated with a plurality of logical data portions;
moving at least one of the plurality of logical data portions from one of the rotation subgroups of the first plurality of rotation subgroups to another rotation subgroup of the first plurality of rotation subgroups; and
directing one or more new data slices to one or more underutilized rotation subgroups of the second plurality of rotation subgroups.

13. The computer program product of claim 12 wherein the plurality of logical data portions includes a plurality of data slices.

14. The computer program product of claim 12 wherein sensing the IO imbalance condition in the first plurality of rotation subgroup includes:
sensing, at the logical layer, an IO imbalance condition in one of the rotation subgroups of the first plurality of rotation subgroups that is associated with the plurality of logical data portions.

15. The computer program product of claim 12 wherein moving at least one of the plurality of logical data portions from the first rotation subgroup to a second rotation subgroup, chosen from the plurality of rotation subgroups includes:
remapping at least one of the plurality of logical data portions from the first rotation subgroup to the second rotation subgroup.

16. The computer program product of claim 12 further comprising:
moving data from a heavily-utilized drive extent to an underutilized drive extent.

17. The computer program product of claim 12 wherein:
the RAID system is a RAID X (Y+Z) system, wherein X is a number representing
a RAID level of the RAID system, Y represents a number of data drives and Z represents a number of parity drives.

18. A computing system including a processor and memory configured to perform operations comprising:
sensing an Input/Output (IO) imbalance condition in one or more rotation subgroups of a first plurality of rotation subgroups that is associated with a plurality of logical data portions, wherein sensing the Input/Output (IO) imbalance condition comprises:
dividing a plurality of storage targets into a plurality of drive extents with an equal, pre-defined capacity, wherein the plurality of storage targets includes a plurality of drives;
defining a plurality of Redundant Array of Independent Disks (RAID) extents from the plurality of drive extents, wherein the plurality of RAID extents includes a first set of RAID extents with a plurality of drive extents from different storage targets with a first performance level and a second set of RAID extents with a plurality of drive extents from different storage targets with a second performance level, wherein each of the plurality of drive extents are only included in one RAID extent; and
pre-defining a plurality of rotation subgroups, wherein pre-defining a plurality of rotation subgroups comprises compartmentalizing the plurality of RAID extents, within a mapped RAID system, into a plurality of rotation, wherein the first set of RAID extents are compartmentalized into a first plurality of rotation subgroups and the second set of RAID extents are compartmentalized into a second plurality of rotation subgroups, wherein a number of the plurality of storage targets in the mapped RAID system is not limited by a RAID level of the plurality of RAID extents, wherein the first plurality of rotation subgroups is associated with a high performance tier comprised of a plurality of rotation subgroups that do not share any drive extents in common and the second plurality of rotation subgroups is associated with a low performance tier of a plurality of rotation subgroups that do not share any drive extents in common, wherein each rotation subgroup within the performance tiers is comprised of an equal number of RAID extents greater than one; and writing a plurality of logical data portions in their entirety to a single rotation subgroup, wherein writing a plurality of logical data portions in their entirety to a single rotation subgroup includes writing a first logical data portion in its entirety to a first rotation subgroup within the first plurality of rotation subgroups;

moving at least one of the plurality of logical data portions from one of the rotation subgroups of the first plurality of rotation subgroups to another rotation subgroup of the first plurality of rotation subgroups; and directing one or more new data slices to one or more underutilized rotation subgroups of the second plurality of rotation subgroups.

19. The computing system of claim 18 wherein the plurality of logical data portions includes a plurality of data slices.

20. The computing system of claim 18 wherein sensing the IO imbalance condition in the first plurality of rotation subgroup includes:

sensing, at the logical layer, an IO imbalance condition in one of the rotation subgroups of the first plurality of rotation subgroups that is associated with the plurality of logical data portions.

21. The computing system of claim 18 wherein moving at least one of the plurality of logical data portions from the first rotation subgroup to a second rotation subgroup, chosen from the plurality of rotation subgroups includes:

remapping at least one of the plurality of logical data portions from the first rotation subgroup to the second rotation subgroup.

22. The computing system of claim 18 further configured to perform operations comprising:

moving data from a heavily-utilized drive extent to an underutilized drive extent.

23. The computing system of claim 18 wherein:

the RAID system is a RAID X (Y+Z) system, wherein X is a number representing a RAID level of the RAID system, Y represents a number of data drives and Z represents a number of parity drives.

* * * * *